(12) United States Patent
Olson

(10) Patent No.: US 8,701,432 B1
(45) Date of Patent: Apr. 22, 2014

(54) SYSTEM AND METHOD OF OPERATION AND CONTROL FOR A MULTI-SOURCE HEAT PUMP

(76) Inventor: Gaylord Olson, Princeton, NJ (US)

( * ) Notice: Subject to any disclaimer, the term of this patent is extended or adjusted under 35 U.S.C. 154(b) by 55 days.

(21) Appl. No.: 13/425,414

(22) Filed: Mar. 20, 2012

Related U.S. Application Data

(60) Provisional application No. 61/465,561, filed on Mar. 21, 2011, provisional application No. 61/630,649, filed on Dec. 16, 2011.

(51) Int. Cl.
*F25D 23/12* (2006.01)

(52) U.S. Cl.
USPC ............................................. 62/260; 165/45

(58) Field of Classification Search
USPC ............................................. 62/260; 165/45
See application file for complete search history.

(56) References Cited

U.S. PATENT DOCUMENTS

| | | | | |
|---|---|---|---|---|
| 2,689,090 A | * | 9/1954 | Wetherbee et al. | ............ 126/584 |
| 3,782,132 A | * | 1/1974 | Lohoff | .............................. 62/260 |
| 4,091,636 A | | 5/1978 | Margen | |
| 4,179,894 A | | 12/1979 | Hughes | |
| 4,336,692 A | | 6/1982 | Ecker et al. | |
| 4,920,757 A | | 5/1990 | Gazes et al. | |
| 5,239,838 A | | 8/1993 | Tressler | |
| 5,461,876 A | | 10/1995 | Dressler | |
| 5,687,764 A | | 11/1997 | Tanaka et al. | |
| 6,167,715 B1 | | 1/2001 | Hebert | |
| 7,228,696 B2 | | 6/2007 | Ambs et al. | |
| 2007/0214815 A1 | * | 9/2007 | Lewkowitz et al. | ......... 62/235.1 |
| 2008/0314064 A1 | | 12/2008 | Al-Eidan | |
| 2009/0320502 A1 | * | 12/2009 | Kurihara et al. | .................. 62/78 |
| 2011/0146321 A1 | | 6/2011 | Jin | |

* cited by examiner

*Primary Examiner* — Cassey D Bauer
(74) *Attorney, Agent, or Firm* — LaMorte & Associates P.C.

(57) ABSTRACT

A heat pump system having a heat pump unit that operates upon a heat exchange fluid. A ground heat exchanger and an ambient heat exchanger are provided. A first valve set is coupled to the heat pump unit, the ground heat exchanger and the ambient heat exchanger. The first valve set can interconnect the input of the heat pump to the ground heat exchanger or to the ambient heat exchanger. The first valve set can also interconnect the ground heat exchanger to the ambient heat exchanger. A second valve set is provided that interconnects the output of the heat pump unit to the ground heat exchanger or to the ambient heat exchanger. The second valve set can also interconnect the ground heat exchanger to the ambient heat exchanger. The multiple modes are offered by the first valve set and the second valve set.

11 Claims, 4 Drawing Sheets

| MODE | V1 | V2 | V3 | V4 | V5 | V6 |
|---|---|---|---|---|---|---|
| MODE 1 | X | O | X | X | O | X |
| MODE 2 | X | O | X | O | X | O |
| MODE 3 | X | X | O | O | X | X |
| MODE 4 | O | X | O | X | O | X |
| MODE 5 | O | X | O | O | X | O |

O – Open
X – Closed

SYSTEM AND METHOD OF OPERATION AND CONTROL FOR A MULTI-SOURCE HEAT PUMP

RELATED APPLICATIONS

This application claims the benefit of U.S. Provisional Patent Application 61/465,561, filed Mar. 21, 2011, the disclosure of which is incorporated into this specification by reference.

This application also claims the benefit of U.S. Provisional Patent Application No. 61/630,649, filed Dec. 16, 2011, the disclosure of which is also incorporated into this specification by reference.

BACKGROUND OF THE INVENTION

1. Field of the Invention

In general, the present invention relates to heat pump systems that are used to provide economical heating, ventilation and air conditioning (HVAC) to a facility. More particularly, the present invention relates to control systems for efficiently operating such heat pump systems.

2. Prior Art Description

Many homes, offices and other buildings utilize heat pump systems to help heat and/or cool the building. Ground source heat pumps utilize the ground under or near the building either as a heat source or as a heat sink. Air source heat pumps utilize the ambient environment either as a heat source or as a heat sink. By using the earth or atmosphere as a heat source/heat sink, energy can be conserved. Consequently, heat pump systems provide an economical solution to many heating and cooling needs.

Prior art ground source heat pump systems typically operate in one of only two possible modes. Either they operate in a heating mode where heat is transferred to the environment of a building from the ground, or they operate in a cooling mode where heat is transferred away from a building environment into the ground. Furthermore, the ability to operate efficiently in either of these modes depends largely upon the temperature differential between the building environment and the ground temperature.

The present invention presents a heat pump system that can operate in at least five different heating modes and five different cooling modes while combining the best features of both ground source heat pumps and air source heat pumps. Furthermore, the selection of the operating mode is automatically controlled in order to optimize efficiency, depending upon environmental conditions and systems needs. This enables the heat pump system to operate much more efficiently than prior art systems. The present invention heat pump system also enables the heat pump to operate with other HVAC equipment, such as solar thermal panels, therein making the heat pump system more versatile and cost effective.

The details of the present invention heat pump system are described and claimed below.

SUMMARY OF THE INVENTION

The present invention is a multi-source heat pump system (air, ground, and solar) which dynamically optimizes the selection of fluid as a source for the heat pump and also dynamically optimizes the heat exchange zone recirculation fluid. The heat pump system is capable of transferring heat with the ground, the ambient atmosphere, a building's interior and optionally at least one solar thermal panel. The system utilizes a heat pump unit as part of the system. The heat pump unit operates upon a heat exchange fluid, wherein the heat exchange fluid passes into the heat pump unit through an input port and exits the heat pump unit through an exit port. The heat exchange fluid is changed in temperature by the heat pump unit.

A ground heat exchanger is thermally coupled to the ground under or around the building to be conditioned. The ground heat exchanger has a fluid input and a fluid output.

A first valve set is provided that is coupled to the fluid input of the heat pump unit, the fluid output of the ground heat exchanger and the ambient atmosphere. The first valve set can selectively interconnect the input port of the heat pump to the fluid output of the ground heat exchanger, or to the ambient atmosphere. The first valve set can also interconnect the fluid output of the ground heat exchanger to the ambient atmosphere depending upon a selected mode of operation.

A second valve set is provided that is coupled to the output port of the heat pump unit, the fluid input of the ground heat exchanger, and the ambient atmosphere. The second valve set can selectively interconnect the output port of the heat pump to the fluid input of the ground heat exchanger or to the ambient atmosphere. The second valve set can also selectively interconnect the fluid input of the ground heat exchanger to the ambient atmosphere depending upon the selected mode of operation.

The multiple modes of operation offered by the first valve set and the second valve set enable the overall system to be operated more efficiently than has previously been possible.

BRIEF DESCRIPTION OF THE DRAWINGS

For a better understanding of the present invention, reference is made to the following description of exemplary embodiments thereof, considered in conjunction with the accompanying drawings, in which:

FIG. 2 is a chart showing the modes of operation for the valve sets shown in FIG. 1;

DETAILED DESCRIPTION OF THE DRAWINGS

Although the present invention heat pump system can be embodied in many ways, only a few exemplary embodiments are illustrated and described. The exemplary embodiments are selected in order to set forth some of the best modes contemplated for the invention. The illustrated embodiments, however, are merely exemplary and should not be considered a limitation when interpreting the scope of the appended claims.

Figure 1:
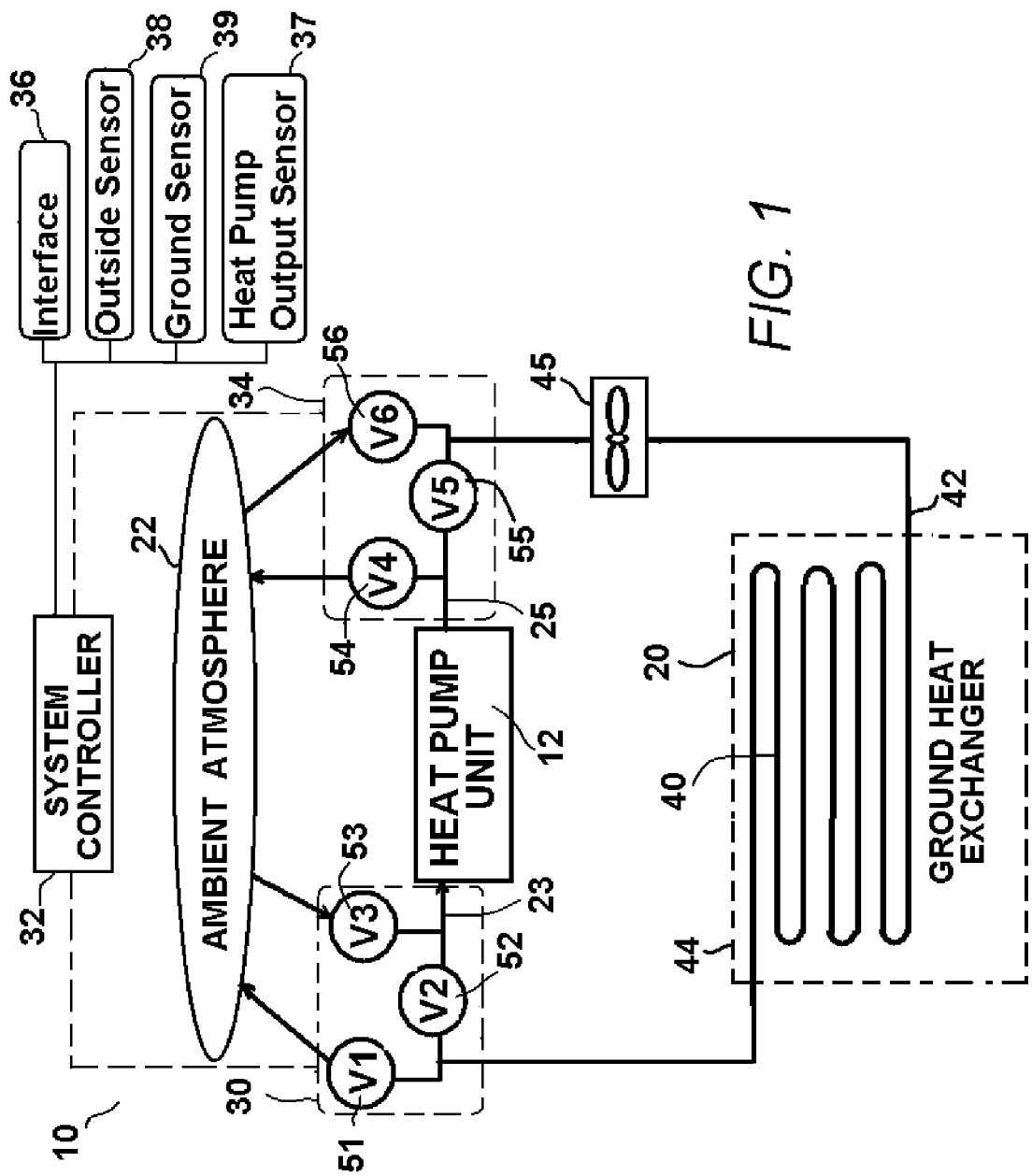
FIG. 1 is a block diagram schematic of a first exemplary embodiment of the present invention system.

Referring to FIG. 1, a schematic overview of a first embodiment of the heat pump system 10 is shown. The heat pump system 10 is used to heat and cool the environment of a building. The heat pump system 10 utilizes a heat pump unit 12. In the illustrated embodiment, the heat pump unit 12 is an air source heat pump unit 12. Accordingly, the heat pump unit 12 exchanges heat with the ground and the atmosphere using air as the transfer fluid.

The heat pump unit 12 draws in source air from either a ground heat exchanger 20 or the ambient atmosphere 22, through an input port 23. The source air passes into the heat pump unit 12, wherein the source air is either heated or cooled by the operations of the heap pump unit 12. The source air exits the heat pump unit 12 through the exit port 25.

The air entering the heat pump unit 12 through the input port 23 can be either drawn from the ambient atmosphere or drawn from the ground heat exchanger 20. The selection of the source air is controlled by a first valve set 30. The operations of the first valve set 30 are controlled by a system controller 32.

The air exiting the heat pump unit 12 through the exit port 25 can be either vented to the ambient atmosphere 22 or returned to the ground heat exchanger 20 using fan 45. The destination of the exiting air is controlled by a second valve set 34. The operations of the second valve set 34 are also controlled by the system controller 32.

The system controller 32 is connected to at least one thermostat interface 36 within the building. It is through this thermostat interface 36 that an occupant of the building can select either the heating mode or the cooling mode for the heat pump unit 12. The thermostat interface 36 also enables the occupant of the building to select a desired internal temperature.

An atmospheric sensor 38, a ground sensor 39, and a heat pump output sensor 37 are also connected to the system controller 32. The atmospheric sensor 38 monitors the temperature of the ambient atmosphere 22. The ground sensor 39 monitors the temperature of the ground around the ground heat exchanger 20. Lastly, the heat pump output sensor monitors the temperature of the heat exchange fluid exiting the heat pump unit 12.

As has been mentioned, the heat pump unit 12 can draw air from the ground heat exchanger 20. The ground heat exchanger 20 may be a series of tubes 40 that are buried within the ground or are in thermal contact with the ground. The ground heat exchanger 20 can also be made by using a hollowed chamber in, under or behind the floor or walls of a basement. Regardless of its structure, the ground heat exchanger 20 efficiently exchanges heat with the ground. Acceptable heat exchanger designs are exemplified in U.S. Provisional Patent Application No. 61/465,561 the disclosure of which has been incorporated into this specification by reference.

The ground heat exchanger 20 has a fluid input 42 and a fluid output 44, where the heat exchange fluid enters and exits the ground heat exchanger 20, respectively.

The first valve set 30 controls the flow of the heat exchange fluid into the heat pump unit 12. As has been previously stated, the heat exchange fluid is air that is drawn from either the ground heat exchanger 20 or the ambient atmosphere 22 as selected by the system controller 32. In the first valve set 30, there are three valving options that are represented by three valves 51, 52, 53. It will be understood that the three valving options can be accomplished using one or two multiport valves that have fewer moving parts. However, for the simplicity of explanation, three separate valves 51, 52, 53 are shown. The second valve 52 is in series with the ground heat exchanger 20 and the heat pump unit 12. As such, any air flowing into the input port 23 of the heat pump unit 12 from the ground heat exchanger 20 has to pass through the second valve 52. The first valve 51 and the third valve 53 communicate with the ambient atmosphere 22 on either side of the second valve 52.

The second valve set 34 controls the flow of heat exchange fluid out of the heat pump unit 12. As has been previously stated, the heat exchange fluid can be vented either back into the ground heat exchanger 20 or out into the ambient atmosphere 22 as selected by the system controller 32. In the second valve set 34, there are three valving options that are represented by three valves 54, 55, 56. It will be understood that the three valving options can be accomplished using one or two multiport valves that have fewer moving parts. However, for simplicity of explanation, three separate valves 54, 55, 56 are shown. In the second valve set 34, the fifth valve 55 is in series with the ground heat exchanger 20 and the heat pump unit 12. As such, any air flowing out of the heat pump unit 12 and into the ground heat exchanger 20 has to pass through the fifth valve 55. The fourth valve 54 and the sixth valve 56 vent to the ambient environment on either side of the fifth valve 55.

Referring to FIG. 2 in conjunction with FIG. 1, it will be understood that using the first valve set 30 and the second valve set 34, at least five modes of operation can be obtained for the heat pump unit 12. In the first mode, the first valve set 30 is arranged so that the second valve 52 is open, while the first and third valves 51, 53 are closed. This enables the heat pump unit 12 to draw source air directly from the ground heat exchanger 20. Furthermore, in the first operating mode, the second valve set 34 is configured so that the fifth valve 55 is open and the fourth and sixth valves 54, 56 are closed. This enables the heat pump unit 12 to expel air directly back into the ground heat exchanger 20. The first operating mode is used to directly exchange heat with the ground heat exchanger 20. Thus, the system controller 32 may select the first operating mode for cooling, if the ground heat exchanger 20 is cooler than the ambient air, and for heating if the ground heat exchanger 20 is warmer than the ambient air.

In the second mode of operation, the first valve set 30 remains the same. Thus, source air is drawn from the ground heat exchanger 20. However, in the second valve set 34, the fifth valve 55 is closed while the fourth and sixth valves 54, 56 are open. As a result, the heat pump unit 12 expels air into the ambient atmosphere and air from the ambient atmosphere is drawn into the ground heat exchanger 20. The system controller 32 may select this mode of operation for cooling if the ambient air is cooler than the air expelled by the heat pump unit 12.

In the third mode of operation, the first valve set 30 is altered so that the first and second valves 51, 52 are closed and the third valve 53 is open. This isolates the ground heat exchanger 20 from the heat pump unit 12 and causes the heat pump unit 12 to draw in ambient air.

In the third mode of operation, the second valve set 34 is configured so that the fourth valve 54 is open, while the fifth and sixth valves 55, 56 are closed. The result is that the heat pump unit 12 is again isolated from the ground heat exchanger 20 and vents air into the ambient atmosphere 22. The system controller 32 may select this third mode of operation for heating if the ambient air is warmer than the ground heat exchanger 20.

In the fourth mode of operation, the first valve set 30 is altered so that the second valve 52 is closed and both the first valve 51 and the third valve 53 are open. This isolates the ground heat exchanger 20 from the heat pump unit 12 and causes the heat pump unit 12 to draw in ambient air.

In the fourth mode of operation, the second valve set 34 is configured so that the fifth valve 55 is open, while the fourth and sixth valves 54, 56 are closed. The result is that the heat pump unit 12 expels air into the ground heat exchanger 20. The system controller 32 may select this fourth mode of operation to defrost, warm or otherwise condition the ground heat exchanger 20.

In the fifth mode of operation, the first valve set 30 is altered so that the second valve 52 is closed and both the first valve 51 and the third valve 53 are open. This isolates the ground heat exchanger 20 from the heat pump unit 12 and causes the heat pump unit 12 to draw in ambient air.

In the fifth mode of operation, the second valve set 34 is configured so that the fifth valve 55 is closed, while the fourth and sixth valves 54, 56 are open. The result is that the heat pump unit 12 expels air into the ambient atmosphere while ambient air is drawn into the ground heat exchanger 20. The system controller 32 may select this fifth mode of operation to cool, warm or otherwise condition the ground heat exchanger 20, while still being able to operate the heat pump unit 12.

It will therefore be understood that using the first and second valve sets 30, 34, the heat pump unit 12, the ground heat exchanger 20, and the ambient atmosphere 22, the system can be operated in at least five different operating modes for either heating or cooling. The ability to operate in these different modes not only enables the heat pump unit 12 to run in the most efficient manner possible, but also enables the ground heat exchanger 20 to be periodically conditioned. Thus, a ground heat exchanger 20 that has become hot during a summer's day can be cooled with the colder air of night. Likewise, a ground heat exchanger 20 that has frozen in the winter can be defrosted using the warmer air from the middle of the day. The ability to condition the ground heat exchanger 20 prolongs the ability of the overall heat pump system 10 to run efficiently. Also, if a large portion of heating and cooling is from outdoor air (perhaps half), the volume of ground needed for heat exchange is correspondingly reduced. As a result, smaller less expensive systems can be used.

Figure 3:
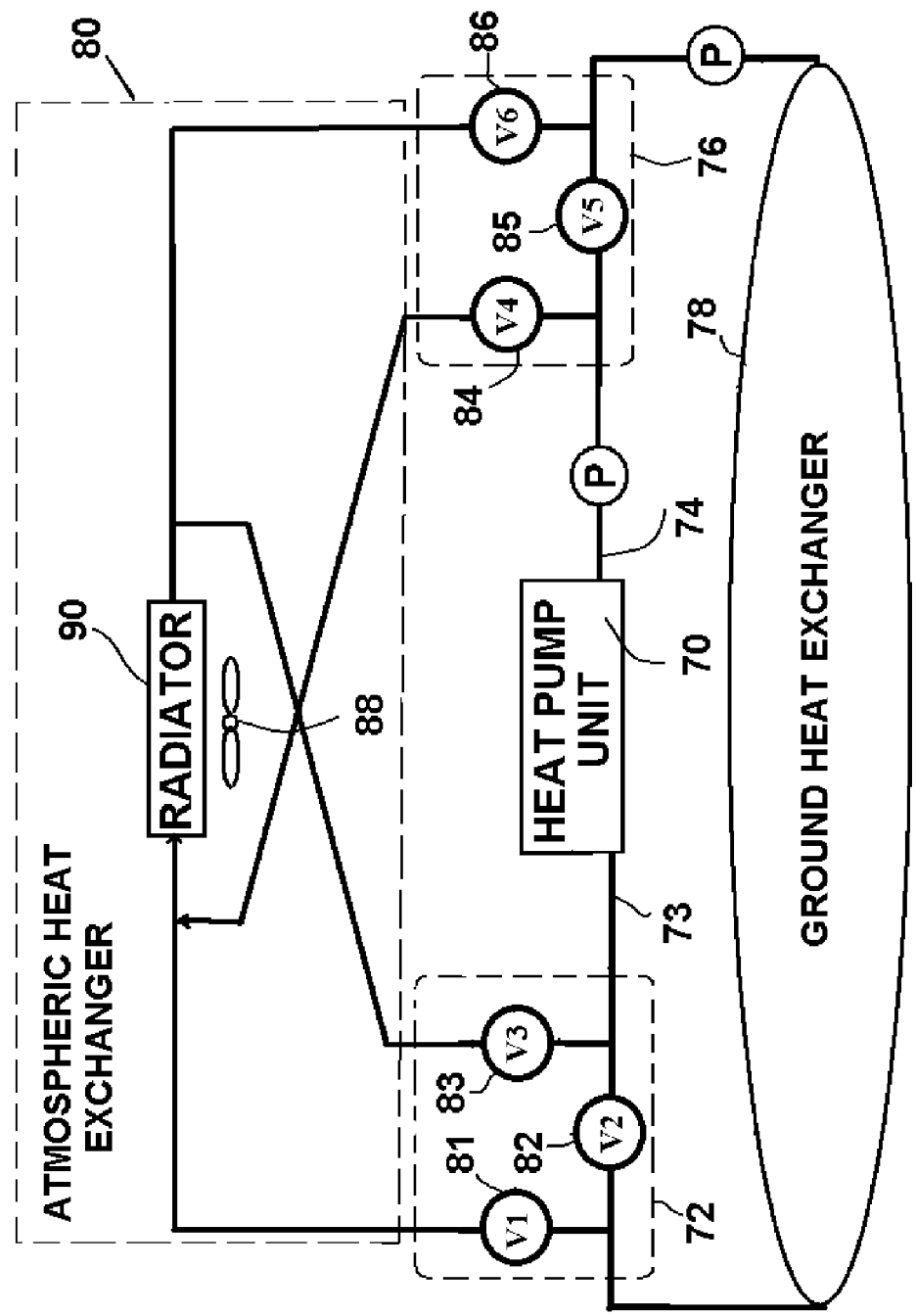
FIG. 3 is a block diagram schematic of a second exemplary embodiment of the present invention system.

Referring to FIG. 3, an alternate embodiment of the present invention is shown, wherein a heat pump unit 70 is provided that is a ground source heat pump. The ground source heat pump unit 70 utilizes a liquid heat exchange fluid, such as antifreeze, instead of air. In the embodiment of FIG. 3, it will be understood that the heat pump unit 70 has the heat exchange fluid that passes through a first valve set 72 on its way to the input port 73 of the heat pump unit 70. Likewise, the heat exchange fluid exiting the heat pump unit 70 passes through the output port 74 and then passes through a second valve set 76. Both the first valve set 72 and the second valve set 76 are attached to a ground heat exchanger 78. The first valve set 72 and the second valve set 76 each contain three valving options that can be represented by the six valves 81, 82, 83, 84, 85, 86 illustrated. However, it should again be understood that the multiple ordinary valves can be replaced by a lesser number of multiport valves having fewer moving parts.

The first valve set 72 and the second valve set 76 are capable of being configured into at least the five modes of operation previously described with reference to the valving chart of FIG. 2. What is different in the embodiment of FIG. 3 is that instead of drawing and venting air into the ambient atmosphere, in the system of FIG. 3 fluid is drawn and passed into an ambient heat exchanger 80 that is an air-cooled radiator system.

The ambient heat exchanger 80 contains a radiator 90 and a draw fan 88. The ambient heat exchanger 80 is either charged hot or cold by heat exchange fluid of the heat pump unit 70. That heat exchange fluid is then either heated or cooled closer to ambient temperature by the ambient air as it passes through the radiator 90. In either case, the heat exchange fluid passing through the radiator 90 is brought closer to ambient temperature. The ambient heat exchanger 80, therefore, provides a means to provide heat exchange fluid at a temperature close to ambient. The ambient heat exchanger 80 of FIG. 3, therefore serves the same purpose as does the ambient atmosphere in the system of FIG. 1.

Figure 4:
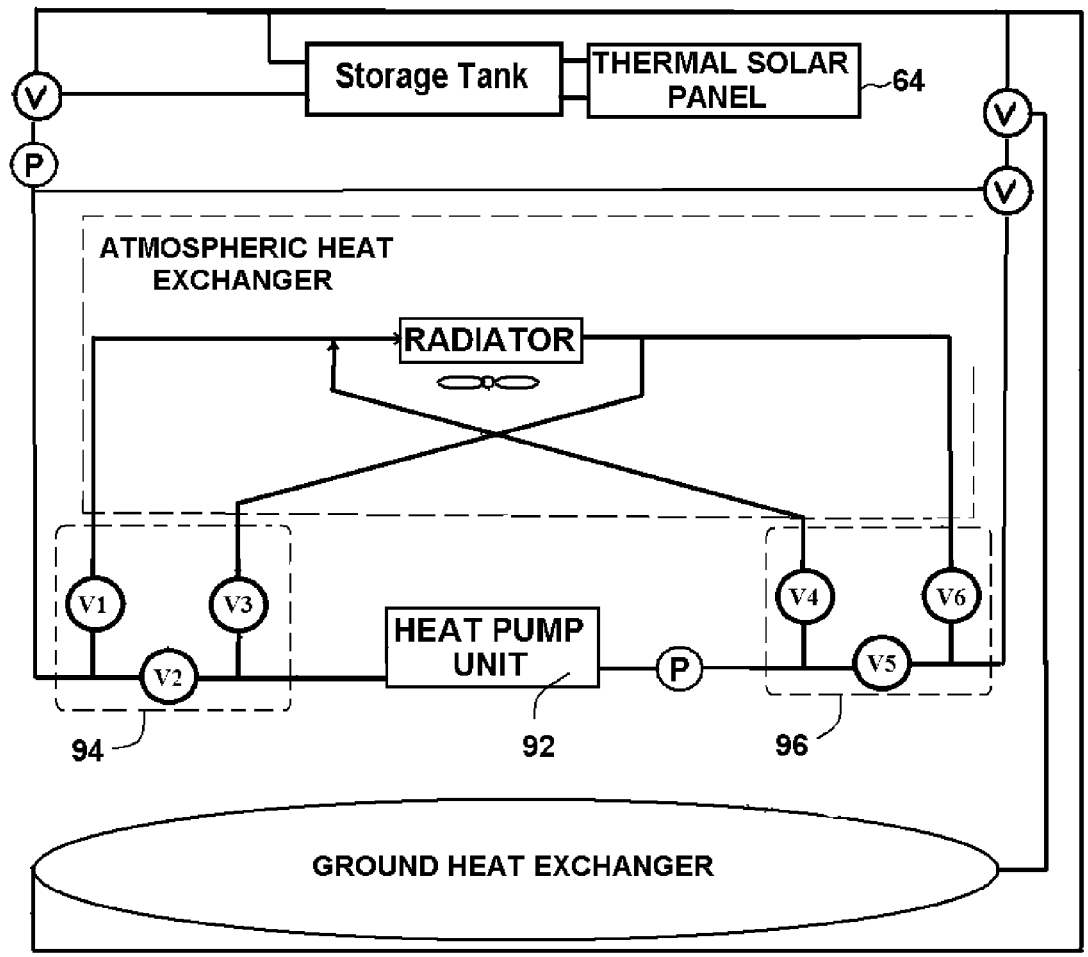
FIG. 4 is a block diagram schematic of a third exemplary embodiment of the present invention system.

Referring lastly to FIG. 4, an embodiment of the present invention system is shown where a heat pump 92 is part of a liquid based system that can pick up heat from secondary heat sources, such as solar thermal panels 64. In this manner, the heat pump unit 92 can be integrated with other systems. When available, solar heat can be used to provide heated fluid to the heat pump unit 92. Solar thermal heat transferred to the ground during the summer months can provide some heating during subsequent winter months. Likewise, heat transferred out of the ground during winter months can be used to the system's advantage during the summer months. The ability to integrate the heat pump unit 92 into these secondary systems greatly expands the usefulness of the heat pump unit 92. Again, the overall system can be operated in at least the five previously described modes using a first valve set 94 and a second valve set 96 that can reproduce the valve modes shown in the chart of FIG. 2.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A heat pump system capable of transferring heat with both a ground source and a surrounding ambient atmosphere, said system comprising:
   an air source heat pump unit, wherein air passes into said heat pump unit through an input port and exits said heat pump unit through an exit port, and wherein said air is changed in temperature by said heat pump unit;
   a ground heat exchanger thermally coupled to the ground source, wherein said ground heat exchanger has an input and an output;
   a first valve set coupled to said input port of said heat pump unit, said output of said ground heat exchanger and the ambient atmosphere, wherein said first valve set can selectively interconnect said input port of said heat pump to said output of said ground heat exchanger, said input port of said heat pump to the ambient atmosphere, and can interconnect said output of said ground heat exchanger to the ambient atmosphere, depending upon a selected mode of operation;
   a second valve set, separate and distinct from said first valve set, that is coupled to said output port of said heat pump unit, said input of said ground heat exchanger and the ambient atmosphere, wherein said second valve set can selectively interconnect said output port of said heat pump to said input of said ground heat exchanger, to the ambient atmosphere, or can interconnect said input of said ground heat exchanger to the ambient atmosphere depending upon said selected mode of operation.

2. The system according to claim 1, further including a system controller for determining said selected mode of operation.

3. The system according to claim 2, further including sensors, coupled to said system controller, for monitoring temperatures within said ground heat exchanger, said heat pump unit and the ambient atmosphere.

4. The system according to claim 1, further including at least one solar thermal panel coupled to both said heat pump unit and said ground heat exchanger through said first valve set and said second valve set.

5. The system according to claim 1, wherein said first valve set and said second valve set have a first operational condition wherein said input port of said heat pump unit and said output port of said heat pump unit are both connected to said ground heat exchanger and both are isolated from the ambient atmosphere.

6. The system according to claim 5, wherein said first valve set and said second valve set have a second operational condition wherein said input port of said heat pump unit is connected to said output of said ground heat exchanger and the ambient atmosphere is connected to said input of said ground heat exchanger.

7. The system according to claim 6, wherein said first valve set and said second valve set have a third operational condition wherein both said input port and said output port of said heat pump unit are vented to the ambient atmosphere.

8. The system according to claim 7, wherein said first valve set and said second valve set have a fourth operational condition wherein said input port of said heat pump unit is vented to the ambient atmosphere and said output port of said heat pump unit is connected to said input of said ground heat exchanger.

9. The system according to claim 8, wherein said first valve set and said second valve set have a fifth operational condition wherein said input port of said heat pump unit, said output port of said heat pump unit, said input of said ground heat exchanger and said output of said ground heat exchanger are all vented to the ambient atmosphere.

10. A heat pump system capable of transferring heat with both a ground source and a surrounding ambient atmosphere, said system comprising:
  a heat exchange fluid selected from a group consisting of air and liquid antifreeze;
  an atmospheric heat exchanger that exchanges heat with the ambient atmosphere;
  a heat pump unit, wherein said heat exchange fluid passes into said heat pump unit through an input port and exits said heat pump unit through an output port;
  a ground heat exchanger thermally coupled to the ground source, wherein said ground heat exchanger has a fluid input and a fluid output;
  a first valve set containing a first valve that controls flow of said heat exchange fluid between said fluid output of said ground heat exchanger and said input port of said heat pump unit, a second valve that that controls flow of said heat exchange fluid between said fluid output of said ground heat exchanger and said atmospheric heat exchanger, and a third valve that controls flow of said heat exchange fluid between said atmospheric heat exchanger and said input port of said heat pump unit, wherein said first valve set can selectively interconnect said input port of said heat pump unit to said fluid output of said ground heat exchanger, and can selectively interconnect said input port of said heat pump unit to said atmospheric heat exchanger, depending upon a selected mode of operation;
  a second valve set containing a fourth valve that controls flow of said heat exchange fluid between said output port of said heat pump unit and said fluid input of said ground heat exchanger, a fifth valve that controls flow of said heat exchange fluid between said atmospheric heat exchanger and said fluid input of said ground heat exchanger, and a sixth valve that controls flow of said heat exchange fluid between said output port of said heat pump unit and said atmospheric heat exchanger, wherein said second valve set can selectively interconnect said output port of said heat pump to said fluid input of said ground heat exchanger, can interconnect said output port of said heat pump to said atmospheric heat exchanger, and can interconnect said fluid input of said ground heat exchanger to said atmospheric heat exchanger, depending upon said selected mode of operation,
  wherein said first valve set and said second valve set have a first operational condition wherein said input port of said heat pump unit and said output port of said heat pump unit are both connected to said ground heat exchanger,
  wherein said first valve set and said second valve set have a second operational condition wherein said input port of said heat pump unit is connected to said fluid output of said ground heat exchanger and said atmospheric heat exchanger is connected to said fluid input of said ground exchanger,
  wherein said first valve set and said second valve set have a third operational condition wherein both said input port and said output port of said heat pump unit are connected to said atmospheric heat exchanger, and
  wherein said first valve set and said second valve set have a fourth operational condition wherein said input port of said heat pump unit is connected to said atmospheric heat exchanger and said output port of said heat pump unit is connected to said fluid input of said ground heat exchanger.

11. The system according to claim 10, wherein said first valve set and said second valve set have a fifth operational condition wherein said input port of said heat pump unit, said output port of said heat pump unit, said fluid input of said ground heat exchanger and said fluid output of said ground heat exchanger are all connected to said atmospheric heat exchanger.

* * * * *